United States Patent
Gachoka et al.

(10) Patent No.: US 10,216,402 B2
(45) Date of Patent: Feb. 26, 2019

(54) METHOD AND APPARATUS FOR RELATED USER INPUTS

(71) Applicant: Nokia Corporation, Espoo (FI)

(72) Inventors: Stephen Kiarie Gachoka, Oulu (FI); Marko Mikael Myllyluoma, Oulu (FI); Raphael Mutiso, Espoo (FI); Julius Sekah Ochiong, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/723,843

(22) Filed: Dec. 21, 2012

(65) Prior Publication Data
US 2014/0181740 A1     Jun. 26, 2014

(51) Int. Cl.
*G06F 3/0488* (2013.01)
*G06F 3/0484* (2013.01)
*G06F 3/0354* (2013.01)

(52) U.S. Cl.
CPC ........ *G06F 3/0488* (2013.01); *G06F 3/04842* (2013.01); *G06F 3/03547* (2013.01)

(58) Field of Classification Search
USPC ....... 715/802, 863, 773; 345/173; 348/14.03
See application file for complete search history.

(56) References Cited

U.S. PATENT DOCUMENTS

| 5,574,840 | A | * | 11/1996 | Kwatinetz | G06F 3/04842 345/163 |
|---|---|---|---|---|---|
| 7,336,257 | B2 | | 2/2008 | Voelckers | |
| 2006/0132457 | A1 | * | 6/2006 | Rimas-Ribikauskas et al. | 345/173 |
| 2007/0157085 | A1 | * | 7/2007 | Peters | 715/531 |
| 2009/0167700 | A1 | * | 7/2009 | Westerman et al. | 345/173 |
| 2009/0228792 | A1 | | 9/2009 | van Os et al. | |
| 2009/0228842 | A1 | * | 9/2009 | Westerman et al. | 715/863 |
| 2009/0254869 | A1 | * | 10/2009 | Ludwig | G06F 3/038 715/863 |
| 2010/0044121 | A1 | * | 2/2010 | Simon | G06F 3/03547 178/18.03 |
| 2011/0221686 | A1 | * | 9/2011 | Kim et al. | 345/173 |
| 2011/0239110 | A1 | * | 9/2011 | Garrett et al. | 715/256 |
| 2011/0248927 | A1 | * | 10/2011 | Michaelis | G06F 3/04845 345/173 |
| 2011/0320978 | A1 | | 12/2011 | Horodezky et al. | |
| 2012/0311437 | A1 | * | 12/2012 | Weeldreyer | G06F 3/0488 715/252 |

OTHER PUBLICATIONS

Microsoft, Introducing Windows 95, 1995, pp. xiv, 72, 73, 74.*

* cited by examiner

*Primary Examiner* — Abdullah Al Kawsar
*Assistant Examiner* — David S Posigian
(74) *Attorney, Agent, or Firm* — Alston & Bird LLP

(57) ABSTRACT

In accordance with an example embodiment of the present invention, there is, a method, comprising detecting a static touch user input defining, responsive to detecting the static user input, a start point for a selection area, and defining the selection area in dependence on a duration of the static touch user input.

16 Claims, 9 Drawing Sheets

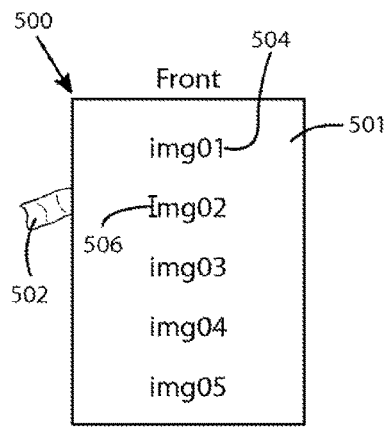
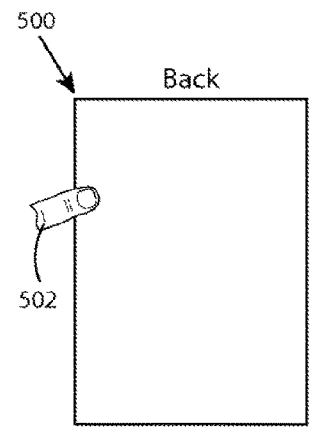
FIG. 5A  FIG. 5B
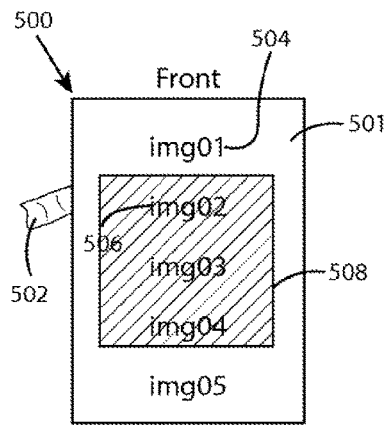
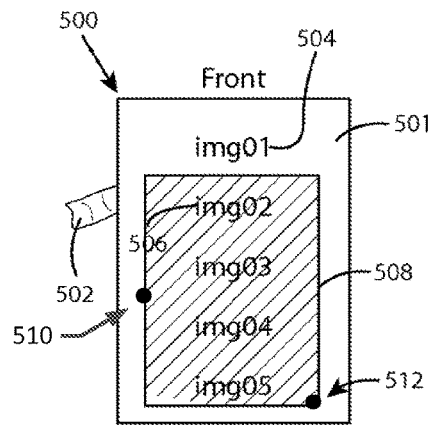
FIG. 5C  FIG. 5D

METHOD AND APPARATUS FOR RELATED USER INPUTS

TECHNICAL FIELD

The present application relates to user inputs and more specifically, to defining a selection area.

BACKGROUND

Electronic devices, such as home computers, mobile telephones and tablet computers, may be used for many purposes via different user applications. For example, a user of a mobile telephone may use an in-built camera of the mobile telephone to take photos or movies using a camera application. The user may send and receive different types of message (such as SMS, MMS and e-mail) using the mobile telephone and messaging applications. The user may also use the mobile telephone to play games via gaming applications, and view and update social networking profiles using one or more social networking applications.

When using an electronic device the user may wish to select items. For example, the user may wish to select from a list of songs only some songs that are to be played or copied. It is possible that the user reads a received message and wants to copy part of the message so that it may be pasted somewhere else. The user may write text and use different form for some parts of the text. To be able to do such things the user usually has to select which item(s) or parts of items are to be operated on. In such a situation, a selection area is often utilized to define the item(s), or parts of items, that are to be operated on.

SUMMARY

Various aspects and examples of some embodiments of the invention are set out in the accompanying claims.

According to a first example of an embodiment of the invention, there is provided an apparatus, comprising at least one processor and at least one memory including computer program code, the at least one memory and the computer program code configured to, with the at least one processor, cause the apparatus at least to:
 detect a static touch user input;
 define, responsive to detecting the static user input, a start point for a selection area; and define the selection area in dependence on duration of the static touch user input.

A static touch user input comprises an input detected at a location. The location does not substantially change during the static touch user input; however, a negligible variation of the location may occur whilst the static touch user input is detected. Such negligible variation may be caused, for example, by a shakiness of the touch input element. Static touch user input also allows a touch input element to perform a rocking gesture at the static location as well as holding the touch input element still. A static touch user input can be a contacting touch input, touch user input meaning that the touch input element touches the screen, a hover input or both.

In some example embodiments, a start point comprises a location at which the static touch user input is detected. In some other example embodiments, the start point is instead at another location, for example, at a location offset from the detected location of static touch user input. Further the start point may first be set to the location at which the static touch user input is detected and then adjusted to the other location.

A selection area comprises an area that causes at least part of an item within the selection area to become selected.

According to a second example of the invention there is a method comprising detecting a static touch user input; defining, responsive to detecting the static user input, a start point for a selection area; and defining the selection area in dependence on duration of the static touch user input.

According to a third example of the invention there is a computer program product comprising a computer-readable medium bearing computer program code embodied therein for use with a computer, the computer program code comprising:
 code for detecting a static touch user input;
 code for defining, responsive to detecting the static user input, a start point for a selection area; and
 code for defining the selection area in dependence on duration of the static touch user input.

According to a fourth example of the invention there is an apparatus, comprising:
 means for detecting a static touch user input;
 means for defining, responsive to detecting the static user input, a start point for a selection area; and
 means for defining the selection area in dependence on duration of the static touch user input.

BRIEF DESCRIPTION OF THE DRAWINGS

Examples of some embodiments of the invention will now be described with reference to the accompanying drawings which are by way of example only and in which:

FIGS. 5A to 5D illustrate image selection according to an example embodiment of the invention;

DESCRIPTION OF EXAMPLES OF EMBODIMENTS

Examples of some embodiments of the invention are described below with reference to FIGS. 1 through 10B of the drawings. Where appropriate, unless explicitly excluded, references to individual components which are described in the singular should be interpreted implicitly as also referring to a plurality of such components which are arranged to provide equivalent functionality. Similarly, unless explicitly excluded and where appropriate, references to a plurality of components arranged to provide certain functionality (whether such components are of the same or of different types) should be interpreted as implicitly referring to a single component where such a single component is capable of providing equivalent functionality.

Figure 1:
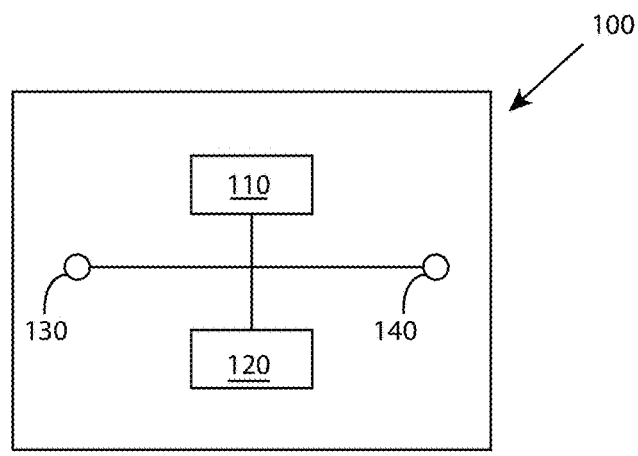
FIG. 1 illustrates schematically apparatus according to a first example embodiment of the invention.

FIG. 1 of the accompanying drawings shows schematically an apparatus 100 according to an example of an embodiment of the invention. In FIG. 1, apparatus 100 comprises a plurality of components including at least one processor 100, at least one memory 120 including computer program code, and one or more suitable interfaces for receiving and transmitting data, shown here as input 130 and output 140 respectively.

An example of a processor 110 of a type suitable for use in the apparatus shown in FIG. 1 comprises a general purpose processor dedicated to execution and/or processing information.

Memory 120 may comprise any suitable computer-readable medium for storing computer program code. Examples of suitable computer-readable media include, for example, but are not limited to: a solid state memory, a hard drive, ROM, RAM or Flash. In some example embodiments, the memory 120 of the apparatus shown in FIG. 1 comprises a plurality of memory units. Each memory unit may comprise the same type or be different types of memory unit to the other memory units. The computer program code stored in memory 120 comprises instructions for processing of information, including, for example, data comprising information which is received via input 130. The instructions are executable by the processor 110.

In the example embodiment shown in FIG. 1, memory 120 and processor 110 are connected by a coupling which allows the processor 110 to access the computer program code stored on the memory 120. The processor 110 and memory 120 are also suitably electrically coupled to the input and output of the apparatus 100, for example, in example embodiments of the invention where the apparatus 100 comprises an electrical integrated circuit, some or all of the components may be integrated with electrical connectivity to form the electrical integrated circuit. In other example embodiments, data may be transferred between some of the components 110, 120, 130, 140 using another suitable type of coupling, for example, if the components are implemented using opto-electronics, by optical coupling.

As shown in FIG. 1, the input 130 provides data to the apparatus 100. The data may, for example, comprise signaling from a component (no examples of such a component are shown in FIG. 1, see FIG. 2 for a schematic illustration of an example of an embodiment of the invention in which examples of such components are shown as user interface 230 and communications unit 240). Output 140 provides data from the apparatus 100, for example, signaling to another component such as the signaling generated by operations performed by the processor 110 (see FIG. 2 for a schematic illustration of an example embodiment of the invention in which an example of such a component is shown as communications unit 240).

Figure 2:
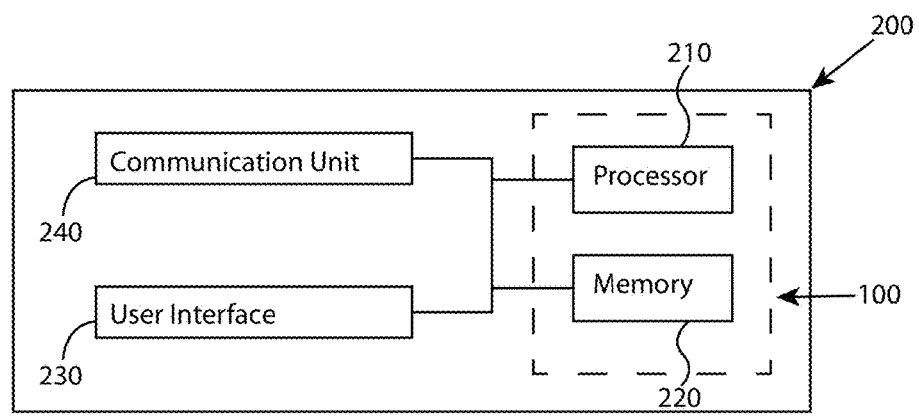
FIG. 2 illustrates schematically apparatus according to another example embodiment of the invention, which incorporates the apparatus of the first example embodiment.

FIG. 2 shows an alternative example embodiment of apparatus 200 according to an example of the invention which includes the components 110, 120, 130, 140 of the apparatus 100 of FIG. 1. Various embodiments of apparatus 200 are possible, for example in some example embodiments, apparatus 100 is provided as a single chip, in other example embodiments apparatus 100 is provided as a circuit, in other example embodiments one or more of the components of apparatus 100 are located separately and dispersed with the other components of apparatus 200. Examples of apparatus 100 provided as a single chip or circuit include, for example, an Application Specific Integrated Circuit (also referred to as an "ASIC"), which may be provided either in an integrated form or as a module. It may also be possible to provide some components outside apparatus 200, for example, some processing may be performed using a remote processor service, such as that offered by a "cloud" server, and similarly other functionality used by apparatus 200 may be provided remotely.

FIG. 2 shows schematically how apparatus 200 incorporates the functionality of apparatus 100 as a module, as is illustrated in FIG. 2 by the dashed line box. Examples of apparatus 200 include devices, for example, communications-enabled devices. Examples of communications-enabled devices include mobile devices such as a mobile phone, where a mobile phone may comprise a so-called "smart phone" having high connectivity and information processing capabilities, Personal Digital Assistant (PDA), tablet computer or the like. Such mobile devices may have wireless connectivity provided by one or more cellular networks and/or local area wireless networks.

In some example embodiments, apparatus 200 is configured to provide suitable data for display (not shown in FIG. 2), which may be a display integrated with apparatus 200 or comprise a display which is connected to the apparatus 200 by a suitable wireless or wired data connection.

Examples of apparatus 200 further include any device capable of supporting a touch-display via which user input is capable of being received to select one or more displayed items or parts of items. Examples of devices which include such a display include domestic appliances with incorporated touch-screen information displays, furniture (e.g. household and automobile and aeronautical seating), remote-control apparatus for other apparatus, and mobile communications devices.

As shown in FIG. 2, apparatus 200 comprises a suitably configured memory 220 and processor 210. Memory 220 may comprise the memory 120 of the apparatus 100 of FIG. 1 and/or use one or more other suitable memory component(s). Similarly, processor 210 may comprise the processor 110 of the apparatus 100 of FIG. 1 and/or use one or more other suitable processor component(s). The memory 220 and processor 210 are suitably connected to data input and output interfaces. The apparatus 200 shown in FIG. 2 also includes a user interface 230 which is arranged to enable a user to provide interact with the apparatus 200 and control the functionality provided by apparatus 200.

The processor 210 shown in the example of FIG. 2 is suitably arranged to receive data from at least the memory 220, the user interface 230 and the communication unit 240, and may also receive data from other components of the device. As mentioned above, processor 210 comprises the processor 110 of the apparatus 100 in some example embodiments of the invention, however, in other example embodiments of the invention processor 210 comprises additionally or instead of processor 110 other processors provided on the apparatus 200. Data is output to a user of device 200 via the user interface 230 and/or is output via a suitably configured data interface to external devices which may be provided with, and/or be attachable to, the apparatus 200.

Memory 220 of apparatus 200 comprises any suitable computer-readable medium for storing computer program code. It may comprise the memory 120 of the apparatus 100 and/or other memory provided on apparatus 200. In some example embodiments, memory 220 comprises one or more memory units of any suitable type(s) appropriate for apparatus 200. Examples of suitable types of memory 220 include: memory provided as an internal built-in component of the device 200 or it may be an external, removable memory such as a USB memory stick, a memory card, network drive or CD/DVD ROM for example. The memory 220 is connected to the processor 210 and the processor may store data for later use to the memory 220.

The user interface 230 may be configured to receive user input via a touch detection feature, and may also include one or more components for receiving user input, for example, a keypad, a microphone and one or more physical buttons. The touch detection may be implemented using any suitable touch detection technology provide by a suitable touch input element. Examples of touch detection technology include: pressure sensing technology, resistive touch technology, capacitive touch technology, infrared touch technology, and proximity sensing technology. Touch detection may be performed using a touch screen, or using any other suitable touch input technique, for example the use of touch sensitive surfaces such as touchpad and graphics tablets that do not necessarily include a display. Touch detection technology may further enable detection of hover gestures made by a user. Hover and touch user inputs may be made using a suitable touch input element. Examples of a touch input element include the user's thumb, finger, palm, or any other suitable body part or object, e.g. a pen or stylus, which may or may not incorporate suitable actuating means such as a touch panel, key or button, which may be placed on or over a touch detection or proximity-sensitive region and detected by apparatus 200. A combination of one or more types of touch detection technology may be used in some example embodiments of the invention for touch user input detection.

The region for touch detection may be located at a certain part of the device 200 or it may extend such that hover gestures may be detected proximate to any part of the device 200. The touch detection feature may be provided by capacitive sensing technology, for example, or by any other means suitable.

The user interface 230 may also include one or more components for providing output to a suitably configured display, and may provide other data for output to other components. Examples of suitably configured displays include a touch display, an LCD display, an eInk display or a 3D display. It is also possible that the display is a near-eye display, such as for example, glasses, worn by a user, which enable content to be displayed to a user's vision. Other components may comprise components such as those used for providing haptic feedback, a headset and/or loud speakers for example. It should be noted that the components for receiving user input and the components for providing output to the user may be components integrated to the device 200 or they may be components that are removable from the device 200.

Some example embodiments of the invention comprise an apparatus 200 having communications connectivity, for example, wireless or wired data or voice connectivity. Communications connectivity may be provided by the apparatus 200 having a suitable means to connect to voice and/or data cellular communications network(s) and/or local area networks which may be wired or wireless (for example, an Ethernet network or a wireless local area network such as Wi-Fi, Wi-Max network and/or a short-range network such as a near field communications network or Blue-tooth network) either directly or via another device (ad-hoc networking) for wireless or wired data or voice connectivity. Connection to such networks is enabled by communications connectivity provided by a communication unit 240 in the apparatus 200 of FIG. 2.

The communication unit 240 comprises suitable components for the appropriate networks, utilized by the apparatus 200 for communications connectivity. Examples of such components include a receiver, a transmitter and/or a transceiver for the appropriate form of communication(s) (not shown in FIG. 2). In some example embodiments, communication unit 240 is connected to an antenna unit for connecting to a wireless network and/or a port for accepting a connection to a network such that data may be received or sent via one or more types of networks. In this way, in some example embodiments, the apparatus 200 is able to connect to various types of network, such as, for example a cellular network, or a Wireless Local Area Network, and/or establish short-range radio communications using communications protocols such as Bluetooth or the like In some example embodiments, the device may use one type of communications link to configure data transfer via another type of communications link By way of example, some example embodiments of the invention comprising various methods of area selection, including areas of text, images, cells, and methods of unselecting using an apparatus 100, 200 will now be described. In one example of an embodiment of the invention, the at least one memory 120 and the computer program code are suitable configured to, with the at least one processor 110, cause the apparatus 100 to perform a selection method, by providing the apparatus 100 with means to detect a static touch user input; means to define, responsive to detecting of the static user input, a start point for a selection area; and means to define the selection area in dependence on a duration of the static touch user input.

More generally, when a user is using a device comprising apparatus 100 or 200, there may be situations in which one or more items or parts of items that are displayed on a display of the device are desired to be selected. The items may be, for example, text, image files, individual letters or words, cropping of an image, icons, or cells for selection in spreadsheet. It may be difficult for a user to mark the items to be selected accurately, easily and effectively when utilizing touch user input detection based user interaction. To aid a user to do this, some example embodiments of the invention provide a method in which the duration of a static touch user input is used to define a selection area.

To define the start point of the selection area, in some example embodiments a user generates a static touch user input gesture on a touch-screen using a suitable touch user input element, for example, as described herein above. In some example embodiments, the start point of the selection area is by default located at the detected location of the touch, or a hover, user input, in other example embodiments it may be off-set by a predetermined amount for example to aid visibility of the selection start point to a user which might otherwise be obscured by the touch user input element (for example, if the touch user input element comprises a user's fingertip or thumb tip, this may be large enough to obscure text underneath).

The selection area is expanded or subtracted from the start point in a given direction in dependence on the duration of the static input and may be automatically chosen by the device in dependence on the type of items that are to be selected. Alternatively, the user may define to which direction the selection area expands or subtracts.

In some example embodiments, a user is able to define a selection area more accurately by fine-tuning the start point and/or the end point of the selection area. The static user input in such example embodiments enables fine-tuning to be implemented, by further including a rocking gesture component.

Various examples of how a selection area may be defined by a static user input according to various example embodiments of the invention are shown schematically in FIGS. 3A to 5D of the accompanying drawings.

Figure 3A:
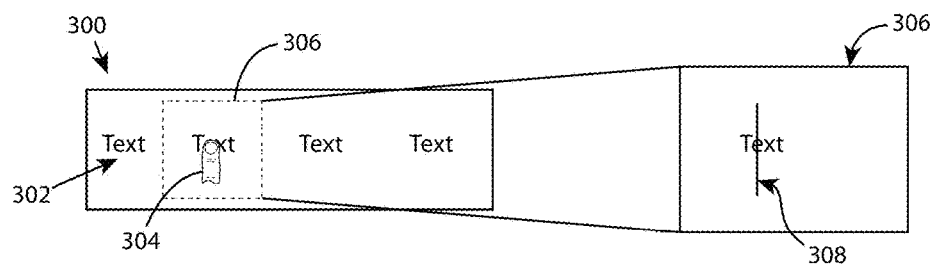
FIGS. 3A, 3B and 3C illustrate text selection according to an example embodiment of the invention.

FIG. 3A shows schematically how user input may be provided to select an area on a display 300. The display 300 may be a touch display. The display 300 may be provided for or located in any suitable apparatus 200, such as, for example, a device such as a mobile phone, a smart phone or a tablet device. The display 300 may be integrated or located in a large appliance, for example in a car or in a domestic appliance. On the display 300, text 302 comprises a series of symbol sequences. For example, each sequence of symbols may comprise one or more alpha-numeric characters or symbols according to a known text font character set, such that a sequence of characters forms a word in the selected text font.

In the example of an embodiment of the invention shown in FIG. 3A, the text 302 comprises Latin-based characters and is read from left to right. By way of example, as shown in FIG. 3A, the touch user input element 304 comprises a user's digit, here a finger. The touch user input element 304 provides a static user input for selection of a start point of the selection area. A language characteristic of the selected text indicates the text is read from left to right, which in one example embodiment of the invention determines the default automatic expansion direction for a selection area from the start point. In the example embodiment shown in FIG. 3A, the touch user input element 304 obscures a view of the selection start point 308, and section 306 surrounding the selected start point 308 provides a view of the touch gesture selection point to facilitate understanding of the invention. A person of ordinary skill in the art will also appreciate that although the view shown in section 306 is magnified for illustrative purposes, in fact, to enable the user's selection of a start point to be viewed more clearly by a user of the device, in some example embodiments such a view is also shown on the display 300. For example, in some example embodiments of the invention the display 300 includes a displaced view of the selection region 306 at a location on the display sufficiently removed from area obscured by the touch user input element 304 to enable the user to see the text which is otherwise covered by the touch user input element 304 and in this text the position of the start point. This displaced region 306 is magnified in some example embodiments of the invention.

Returning to FIG. 3A of the accompanying drawings, section 306 comprising a view of the region surrounding the selected start point 308 is magnified to illustrate the location of the start point 308 which would be otherwise obscured by the touch input element. As shown in section 306, the start point 308 indicates the location at which a touch input, given by the touch user input element 304, is first detected.

Consider an example of an embodiment of the invention in which a part of the text 302 is to be selected by a user. First, the user generates a suitable static touch user input using a touch user input element 304. For example, a user may place a finger on the display between two letters of a word. In an alternative example of an example embodiment, the touch input element comprises a stylus. The word is included in the text 302. Section 306 in FIG. 3A illustrates how a start point 308 of a selection area is inserted in response to the detection of the static user input generated by the touch user input element 304 being placed on the display 300. In alternative example embodiments of the invention, other types of static user input may select a start point. For example, if display 300 is configured to detect hover gestures, the static user input could comprise a detection of the touch input element hovering substantially still above a display.

The context of the initial start point may in some example embodiments determine the granularity at which the selection method initially expands the selection area. For example, if the start point 308 for the selection area is placed within a sequence of adjoining characters forming a selectable item, the initial granularity of selection is within the selectable item and one character at a time is selected in the pre-determined selection direction. So, for example, in the example embodiment of the invention shown in FIG. 3A, where the user has placed the touch user input element 304 so that the start point is within a word, i.e., between two letters, the initial granularity for expanding the selection area comprises a single letter. If the initial start point was selected as between two "words" or equivalent selection items (for example, number sequences etc.), the granularity at which the selection is expanded is instead at the "word" or "selection item" level.

In some example embodiments, a start point may be adjusted automatically to the beginning of the word even though the static touch user input is detected within the word, between two letters of the word. In some example embodiments, if the initial granularity is within a selectable item, once that part-item has been selected, the granularity automatically readjusts to select entire items at a time.

It should be further noted that the granularity may be defined by a user. For example, the user may utilize settings of a device incorporating the display 300, to determine the granularity to be used.

Figure 3B:
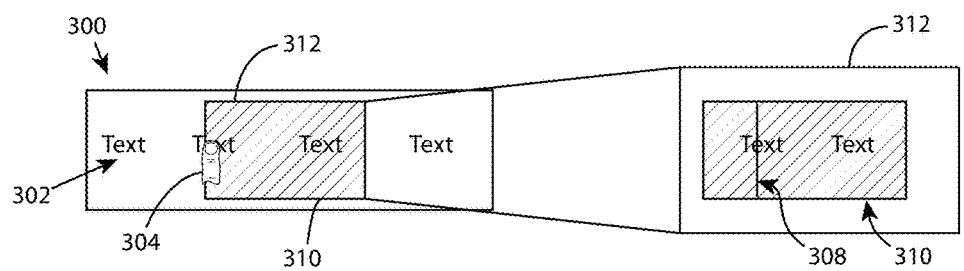

FIG. 3B illustrates another example of an embodiment of the invention in which, in addition to the display 300, text 302, touch user input element 304 and start point 308 there is a selection area 310 illustrated. The selection area is an area within which letters are caused to become selected. Section 312 illustrates a magnified version of the illustration regarding the example embodiment.

Figure 3C:
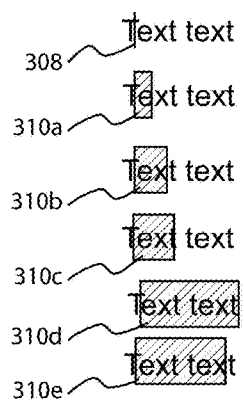

FIGS. 3B and 3C illustrate an example embodiment of the invention in which, when the touch user input element 304 is held still, the selection area 310 expands from left to right. In this example embodiment, the direction for expanding the selection area 310 is determined automatically by the apparatus 200 once the language of the text is determined (for example, by a language setting or if the text is recognized otherwise by apparatus 200), for example, the expansion direction may be determined by a characteristic of the text language. In some example embodiments, the user defines as a setting the direction in which a selection area is automatically expanded.

The expansion of the selection area 310 is started when the user holds the touch user input element 304 still. When holding the touch input element still, the selection area 310 begins to expand to right from the start point 308, as FIG. 3C illustrates. The selection area 310 expands at a fixed rate in some example embodiments of the invention, but in other example embodiments the rate at which the selections area expands 310 varies.

The way the selection area expansion rate varies may be, for example, such that the selection rate accelerates as the size of the selected area increases. In this way, the selection rate increases as the duration of the static touch user input increases. Alternatively, the selection rate may increase in granularity as the duration of the static touch user input increases.

Examples of different levels of granularity for the expansion of the selection area 310 shown in FIG. 3A to select text as shown in FIG. 3B include: letter-by-letter (i.e., one letter at a time, shown in FIG. 3C as selection area 310a ("e"), 310b ("es"), 310c ("est"), word-by-word (i.e., one word at a time, shown in FIG. 3C in the progression from selection area 310c to selection area 310d), line-by-line (i.e., one line at a time), sentence-by-sentence (i.e., one sentence at a time) or any other suitable level of granularity (e.g. in a spreadsheet: cell-by-cell or row by row; in an image, pixel-block by pixel-block or macro-block by macro-block).

Once the selection area 310 has expanded such that it covers the parts that user wishes to mark as selected, the user may end the expansion of the selections area 310 by removing the input provided by the touch user input element 304, for example, by lifting a finger or stylus from the display 300, or alternatively, by actuating a key or button or touch panel on a stylus to prevent the stylus from providing touch input to display 300. Once the static touch user input is no longer detected, the expansion of the selection area 310 is ended. In some example embodiments, however, the user may wish to deselect some of the selected area, for example, in FIG. 3C, selection area 310e shows the selection area 310d reduced by one letter so that the total area selected comprises the text "est tes" within the text "test test". The de-selection may be done utilizing any suitable means available.

Figure 4A:
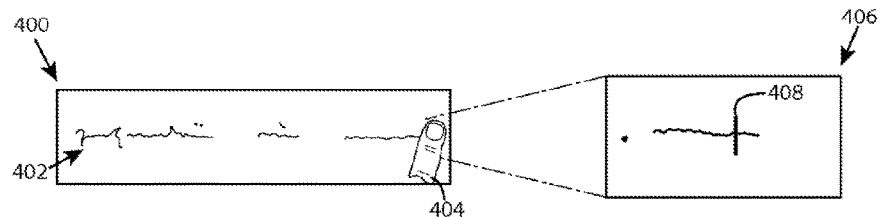
FIGS. 4A to 4D illustrate text selection according to another example embodiment of the invention.

In FIG. 4A there is shown a display 400. The display is a touch display that is capable of detecting touch and hover user inputs. On the display 400, there is text 402. The text 402 is written in a language that is to be read from right to left. By way of example, a touch user input element 404 comprising a user digit, here a finger, is also illustrated, which is used by a user as input means. Section 406 magnifies a portion of the FIG. 4a to better illustrate the example of an embodiment. Start point 408 is a place on the display at which the touch user input element 404 is detected.

FIG. 4A illustrates a situation in which there is text 402 displayed on a display 400. The touch display may be located on any suitable device (not illustrated) such as, for example, a mobile phone, or a tablet device comprising apparatus 100 or 200. In order to select part of the text 402, the touch user input element 404 is placed on the display 400 substantially at the point that should be a start point 408 for selecting the part of the text 402 that is to be selected. The start point 408 is determined, by the device, to be located at the position on the display at which the touch user input element 404, illustrated as a user's finger, is detected. Detecting the touch input element in this example of an embodiment of the invention is accordingly included in detecting a static touch user input. Section 406 of FIG. 4A illustrates how the start point 408 is determined, by the device, to be positioned at the point at which the touch user input element 404 is detected as providing the initial touch input on display 400.

Figure 4B:
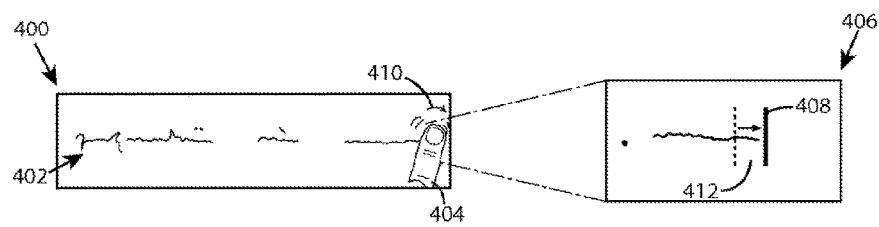

In FIG. 4B, in addition to the elements introduced in FIG. 4A, there is a rocking gesture 410. The rocking gesture 410 is a gesture in which the user rocks the touch input element, while holding it substantially at the start point 408. In some examples the action of the rocking gesture 410 may result in a minor displacement of the point or area determined to be the location of the touch while remaining substantially at the start point 408. A rocking gesture may be differentiated from a swipe gesture based on any suitable criteria, for example based on the magnitude of any variation in the touch location, or based on a detection of a change in the angle at which the user's finger or other pointing device contacts the display 400. In section 406 there is an adjusted start point 412 illustrated. The adjusted start point 412 is a start point for a selection area that has been adjusted to a desired location from the start point 408.

FIG. 4B illustrates how the user may adjust the start point 408 in case the static touch user input was not detected at the point from which the user wishes to start the selection from. After placing the touch user input element 404 on the display 400 the user may, without removing input from the touch user input element 404 at the initially detected location, adjust the start point. By way of example, if the touch user input element 404 comprises a finger, without lifting a finger after placing the finger on the display at the initially detected point, the user can do a rocking gesture 410 using the finger. This rocking gesture 410 is done without changing the location of the finger. The device may detect small variation of the location of the finger, such as caused by the rocking gesture that includes a rocking component, which is a characteristic of the rocking gesture detectable to a device, as part of the static touch user input. When detecting the rocking component, the device determines the adjusted start point 412 in dependence on the rocking component detected. If the rocking component detected is targeted towards right, as illustrated in FIG. 4B, then the adjusted start point 412 is moved to right on the display. If the user then wishes to have the adjusted start point 412 on left of the start point 408, the user may rock the tip of the touch input element to left. The device consequently detects that there is a rocking component towards left included in the static touch user input and moves the adjusted start point 412 towards left from the start point 408. In alternative example embodiments, the user may first place the touch input element on the display, then lift it such that the input is still detected as hover input and check where the start point is. If an adjusted start point is needed, then, while hovering, the rocking gesture is done to place the adjusted start point to a correct location. Alternatively, the user may do the rocking gesture while the touch input element is hovering. In FIG. 4B, section 406, it is illustrated how the start point 408 has been adjusted from its original place 412.

Figure 4C:
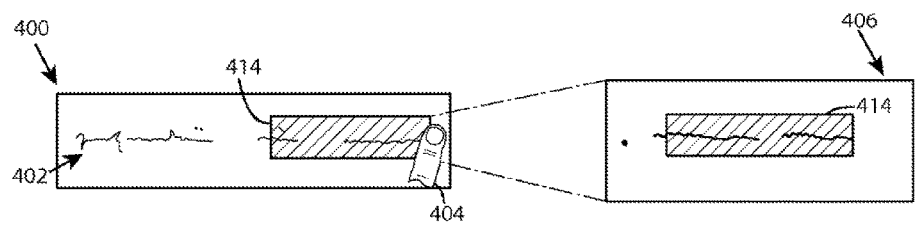

In FIG. 4C an example of a further feature, selection area 414, is illustrated. The selection area 414 is an area within which items become selected.

In FIG. 4C the user holds the touch user input element 404 still. Holding the touch user input element 404 still causes the selection area 414 to be expanded to left in dependence on the duration of the touch user input element 404 being held still. That is, the longer the touch user input element 404 is held still, the more the selection area 414 expands. As the text 402 to be selected is in such a language that is read from right to left, the device automatically begins to expand the area towards left. In alternative example embodiments, the user is able to select the direction for expansion.

In this example of an embodiment, the rate at which the selection area 414 expands is static. In alternative example embodiments the rate at which the selections area expands may vary. The way the rate varies may be for example such that the speed of the extension increases as the duration of the finger being held still increases. In this example of an embodiment, the granularity of the expansion of the selection area 414 is one letter. In some alternative embodiments, the granularity of the expansion of a selection area may be for example one word, one line, one sentence or any other suitable granularity. In some alternative example embodiments, the granularity of the expansion may also vary.

For example, the granularity may first be one letter. Then as the touch input element is held still for a pre-determined amount of time, the granularity changes to one word. In some examples of embodiments, the granularity and/or the speed of the expansion of the selection area may be user-definable.

Figure 4D:
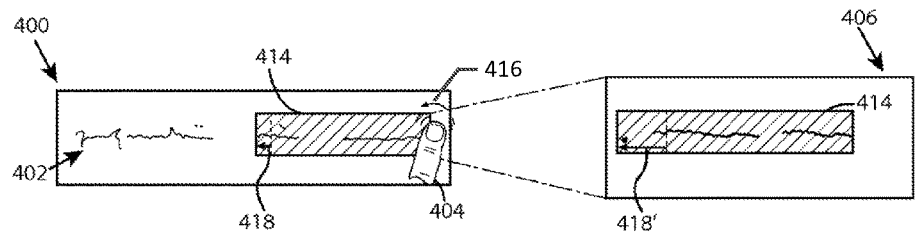

In FIG. 4D there is a rocking gesture 416 illustrated. This rocking gesture is similar to the rocking gesture 410 introduced in FIG. 4B. In FIG. 4D there is also an end point 418 illustrated. The end point 418 is the end point of the selection area 414.

In FIG. 4D the touch user input element 404 has been held still such that the selection area 414 has expanded almost to the point in which the user would like the selection area 414 to end. The rate of the expansion may be such that the user finds it hard to stop input being provided by the touch user input element 404 at exactly the correct moment. For example, in example embodiments where the touch user input element 404 comprises a user's digit, it may be difficult for a user to lift off their digit from the display 400 at the exactly correct moment. To enable the selection area 414 to end at the desired end point 418, a rocking gesture 416 is done before the desired end of the selection area 414 is reached when the selection area 414 keeps expanding in dependence on the duration of the static touch user input. The point in which the user begins to do the rocking gesture 416 is illustrated with a dashed line in the selection area 414. By doing the rocking gesture 416, the user may fine-tune the end of the selection area easily. If the user rocks the touch user input element 404 towards right, the end of the selection area 418 is fine-tuned towards right. If the user rocks the touch user input element 404 towards left, then the end point 418 of the selection area 414 is adjusted to left. In FIG. 4D, the adjustment 418 is made towards left as a consequence of the rocking gesture 416 made towards left. Now that the user has selected from the text 402 the part he wished to select, the user stops the input provided using the touch user input element 404, which may be done, for example, by lifting a finger or stylus from the display, and the desired part of the text 402 remains selected.

In some examples of embodiments of the invention, the user does not provide input on a touch-sensitive display but instead provides input to another touch-sensitive part of apparatus 200, for example, to an area below or above the screen or to the back of the apparatus 200. Further, in some examples of the embodiments of the invention, the rate of the expansion of an area for selection is dependent upon the extent to which a user digit has been rocked. For example, the user digit is rocked for a long way, the rate is faster. The rate then may be slowed down by reducing the amount of rocking as the desired end of the selection area.

FIGS. 5A to 5D illustrate such an example of such an example embodiment of the invention in which a device 500 comprises apparatus 100, 200.

The device is capable of detecting touch and hover user inputs on the back of the device 500. As shown in FIG. 5A, the device 500 comprises a display 501 including a list of image files 504. Start point 506 on the display 500 corresponds to the detected location of the static user input provided by a touch user input element 502 touching the back of the device 500.

In one example of an embodiment of the invention such as is shown in FIG. 5A, the static user input which selects the start point 506 is provided by a user initially bringing touch user input element 502 into close proximity to the device 500. When the touch user input element 502 is detected to hover in the proximity of the back of the device 500, there is an indication on the display 501 indicating the place at which the start point 506 would be should the user touch the back of the device 500 with the touch user input element 502. Placing the touch user input element 502 on the back of the device 500 then results in the static user input being detected causing the start point 506 to become selected (as illustrated in FIG. 5B).

FIG. 5C illustrates an example of an embodiment of the invention comprising a selection area 508. In this example embodiment, selection area 508 has expanded from top to down in accordance with the duration of the static touch user input detected at the back of the device 500 in accordance with a user's selection of a pre-defined expansion direction from the initially selected start point. In alternative example embodiments, the direction may be asked or it may alternatively be automatically determined based on the type of the items displayed on the display. In some example embodiments, after the touch user input element 502 has been placed on the back of the device to define the start point 506 on the front display the touch input element is lifted to a position in which a hover input is detected and then the touch input element is held still, with the selection area expanding in accordance with the duration of the hover input.

In FIG. 5D there are, in addition to the elements already introduced, selection area handles 510 and 512 illustrated. These handles are to help the user to adjust the selection are 508 if needed.

In FIG. 5D, the selection area has been expanded to cover the area desired and the touch user input element 502 has been removed from the back of the device 500. The selection area 508 in FIG. 5D was expanded over all the image files 504 that the user wanted to select. After the user took the touch user input element 502 away, the selection area 508 was enhanced with handles 510 and 512. These handles may be used, using the touch user input element 502, to modify the selection area. By touching at a location corresponding to the handle 510 or 512 the user may adjust the extension of the selection area 508 by sliding the touch user input element 502 towards the direction to which the selection area 508 is to be adjusted. That is, if the user, while touching the handle 510 or 512, drags the handle up or down, the selection area 508 is consequently modified in accordance with the dragging. In this example embodiment, dragging means that the user touches at the location of the handle 510 or 512 and then without stopping input by the touch user input element 502 (for example, without lifting a user digit), slides the touch user input element 502 to the direction to which the user wishes to adjust the selection area 508.

Figure 6A:
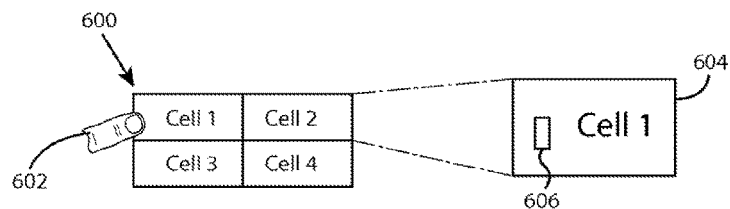
FIGS. 6A and 6B illustrate cell selection in a spreadsheet application according to an example embodiment of the invention.

Another example embodiment of the invention will now be described with reference to a spreadsheet 600 as is illustrated in FIG. 6A. The spreadsheet 600 comprises a plurality of cells forming an array for data entry, just four of which are shown in FIG. 6A by way of example. The spreadsheet 600 is generated using any suitable spreadsheet application running on any suitable device that is capable of detecting a static touch user input, for example, a tablet device or any other suitable device such as is described above in the context of the other example embodiments. Touch input is provided by a touch user input element 602, which in FIG. 6A by way of example comprises a user digit, although any other suitable touch input means, e.g. a stylus or other means as described herein above with reference to one or more of the other example embodiments may be used. Section 604 magnifies cell 1 of the spreadsheet 600 and contains touch location 606. The touch location 606 illustrates the location in cell 1 in which the touch user input element 602, such as the user's digit, is introduced.

By way of example of an embodiment of the invention, a method of cell selection will now be described. Consider when a user wishes to select one or more cells of the spreadsheet 600. The user places touch user input element 602 on to the cell from which selection is to begin. In this example embodiment, the touch user input element 602 is placed on cell 1, as is illustrated in section 604 of FIG. 6A. In the section 604, there is the touch location 606, which depicts the place on cell 1 in which the touch user input element 602 is detected by the device.

Figure 6B:
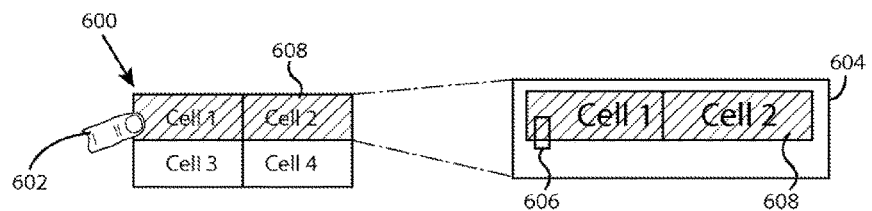

FIG. 6B introduces, in addition to the elements mentioned above, a selection area 608. In FIG. 6B it is illustrated how, by keeping the touch user input element 602 on the cell 1, a selection area 608 is expanded to right making each cell that it covers selected. Alternatively, the selection area 608 could expand to the cell below the cell from which the selection area 608 begins. The direction to which the selection area expands may be user-definable or alternatively, it may be automatically determined. The rate at which the selection area 608 expands may be user definable or alternatively, it may be automatically determined. The rate may also vary in dependence on the duration of the touch user input element 602 being kept on the cell 1. Once the user is happy with the selection area 608, the user, lifts the touch user input element 602. The selection area 608 has now been defined and the cells to be selected have become selected.

Figure 7A:
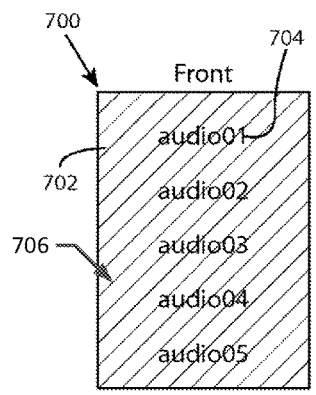
FIGS. 7A and 7B illustrate unselecting part of a selection area according to an example embodiment of the invention.
Figure 7B:
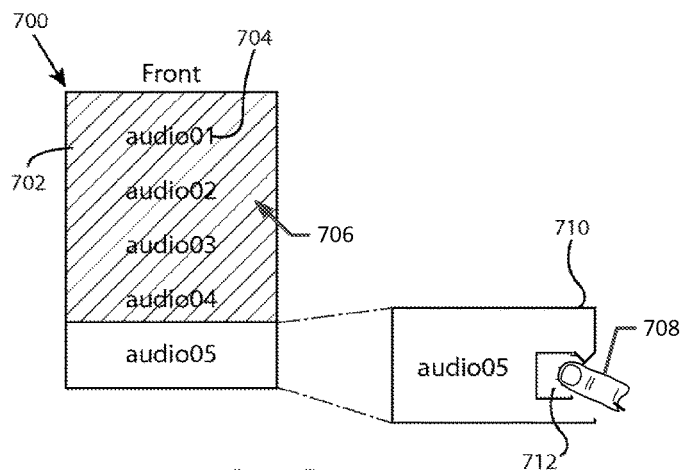

FIGS. 7A and 7B illustrate an example of a method of unselecting a previously selected area according to an example embodiment of the invention. The previous selection may or may not have been selected using a method according to an example embodiment of the invention.

In FIG. 7A a list 702 of audio files 704 is displayed on a touch-display 700. All the items in the list are covered by a selection area 706 and thus all audio files 704 in the list 702 are selected. In this example embodiment the user wishes to unselect audio 05—item from the list 702.

In FIG. 7B there are, in addition to the elements introduced above with regard to FIG. 7A, a selection area 706 and a touch user input element 708, which by way of example is illustrated as a user digit. In FIG. 7B there is also a section 710 illustrated. The section 710 is a magnified section that helps to illustrate the example of an embodiment of FIG. 7B. In the section 710 there is a touch location 712 which is a location at which the touch user input element 708 is detected.

To unselect the previously selected area, the audio 05—item from the list, in this example of an embodiment, the user places the touch user input element 708 on the audio 05—item as illustrated in FIG. 7B. Especially in section 710 of FIG. 7B it is illustrated how the touch user input element 708 is detected at the touch location 712. In some alternative example embodiments, the touch user input element 708 comprises a thumb or a stylus, or other suitable input means such as have been described herein above with reference to the other example embodiments of the invention, or which would otherwise be apparent to one of ordinary skill in the art. The touch user input element 708 is placed on the item the user wishes to unselect. In this example of an example embodiment, once the touch user input element 708 is detected at the touch location 712 and it is detected that the input element is held still, the selection area 706 begins to contract away from the audio 05 item thus making the audio 05—item unselected. If the user is happy with unselecting only audio 05—item, the touch user input element 708 is lifted away from the touch location 712 or some other suitable means is employed to remove the touch input, for example, if the touch input element comprises a stylus, this may be achieved by actuating a button, key or touch sensitive area provided on the touch input stylus itself.

Alternatively, if the user wishes to unselect more items, the touch user input element 708 is held still to maintain the touch input at the touch location 712 and the selection area 706 consequently continues to contract away from audio 05—item making other files, that are no longer covered by the selection area 706, unselected as well.

It should be noted that in addition to the illustrated examples of embodiments, it is possible to have other kinds of examples of embodiments as well. For example, in one example of an embodiment the user may know what is on the screen by using voice user interface.

By way of example of a voice interface example embodiment of the invention, which is not illustrated, a device speaks to the user and understands spoken commands given by the user. In such an environment the user may for example hear a message the device is reading. The user may then wish to select part of the text that can then be copy pasted to another message. At a certain part of the message the user may then touch the device. The device detects the touch input and thus marks selected all the items it reads to the user while the user holds the input still.

Another such an example, which is not illustrated, is that the user wears near-eye display glasses. Such glasses enable the user to see displayed items in his vision. Such a display may be connected to a touch detection unit for detecting a touch input element such as, for example, a user's finger. The user may utilize the detection unit to select a start point for the selection area and then hold the touch input element still to select items. The user may see a visualization of the selection displayed on the near-eye display.

Figure 8:
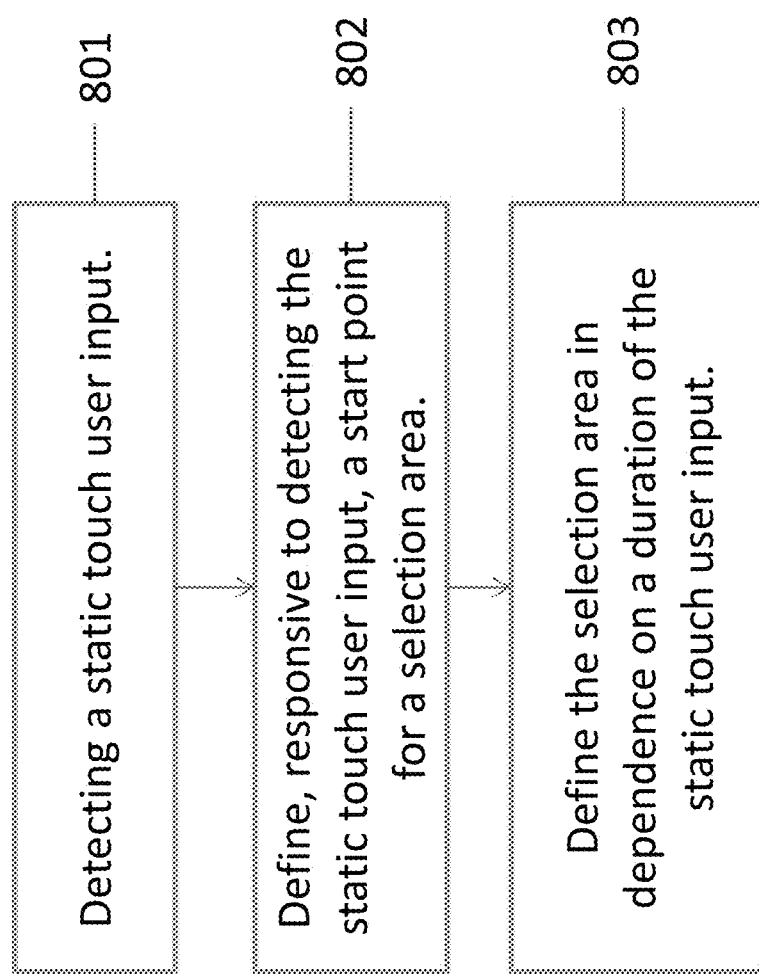
FIGS. 8, 9, 10A and 10B illustrate example steps in selection methods according to example embodiments of the invention.

In FIG. 8 there is a flow chart illustrating a method of area selection according to an example of an embodiment of the present invention. The method comprises detecting 801 a static touch user input, for example, one provided by a touch input element and detected via a suitable user interface. Static touch user input may comprise touch user input generated by a user holding a touch input element substantially at the same place during the whole duration of the input. Static touch user input may also comprise hover user input generated by a user holding the touch element substantially at the same place, i.e., if the detected touch input area is within a certain limit, such as the minor variation in the location due to, for example, natural shaking of a user's hand holding the touch input element or a user digit. Static touch user input may, in some example embodiments, include input generated by a rocking gesture, which does not involve a swiping gesture, of the touch input element (for example, a user digit or stylus). The rocking gesture may comprises input which oscillates about a substantially static point, for example, input similar to, but distinguishable from, a shaking gesture. The touch user input provided by the touch input element comprises both detecting a physical touch user input and also a hover user input, which may be detected, for example, by utilizing the same sensing technology as when detecting the physical touch input. Responsive to detecting the static touch user input, a start point for a selection area is defined 802. A selection area is an area that causes at least part of an item, which is located within the selection area, to become selected. The selection area is defined in dependence on the duration of the static touch user input 803.

Figure 9:
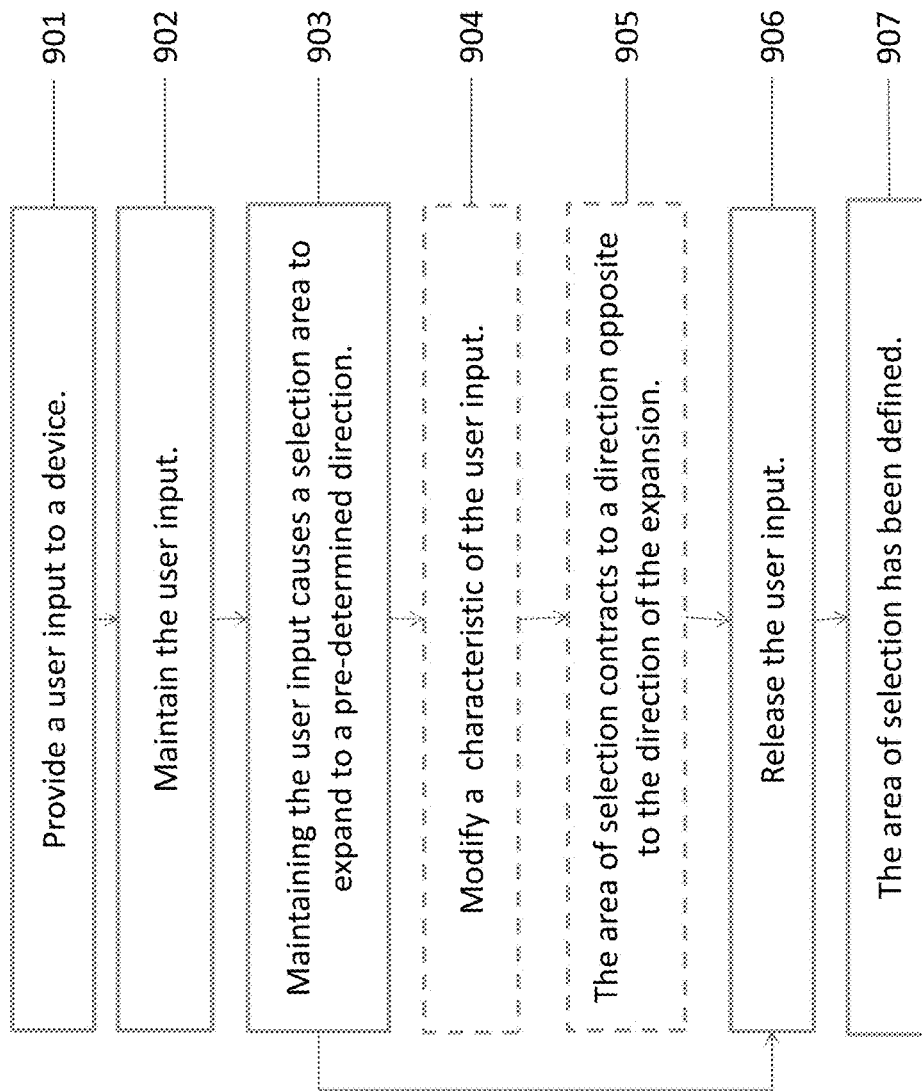

In FIG. 9 there is a flow chart depicting another example embodiment of the present invention. A user input is provided 901. The user input may be for example a touch user input or a hover input. The user input may be given using any suitable touch input element, for example a user digit or a stylus. The user input is maintained 902. When a user input is maintained, input from the touch input element is constantly detected. Maintaining the user input causes a selection area to expand to a pre-determined direction 903. When the direction is pre-determined, it may be set by the user before providing the user input. Alternatively, the direction may be automatically determined. Optionally, the user may modify a characteristic of the user input 904. A characteristic of a user input that may be modified may include for example, a rocking gesture or changing from a touch input to a hover input or vice versa or variation of the pressure applied by the user input. Further, optionally, the variation in the characteristic of the user input causes the area for selection to contract to a direction that is opposite to the direction of the expansion 905. The user releases the user input 906. That is, the user input provided by the touch input element cannot be detected anymore. As a consequence the area of selection has now been defined 907.

Figure 10A:
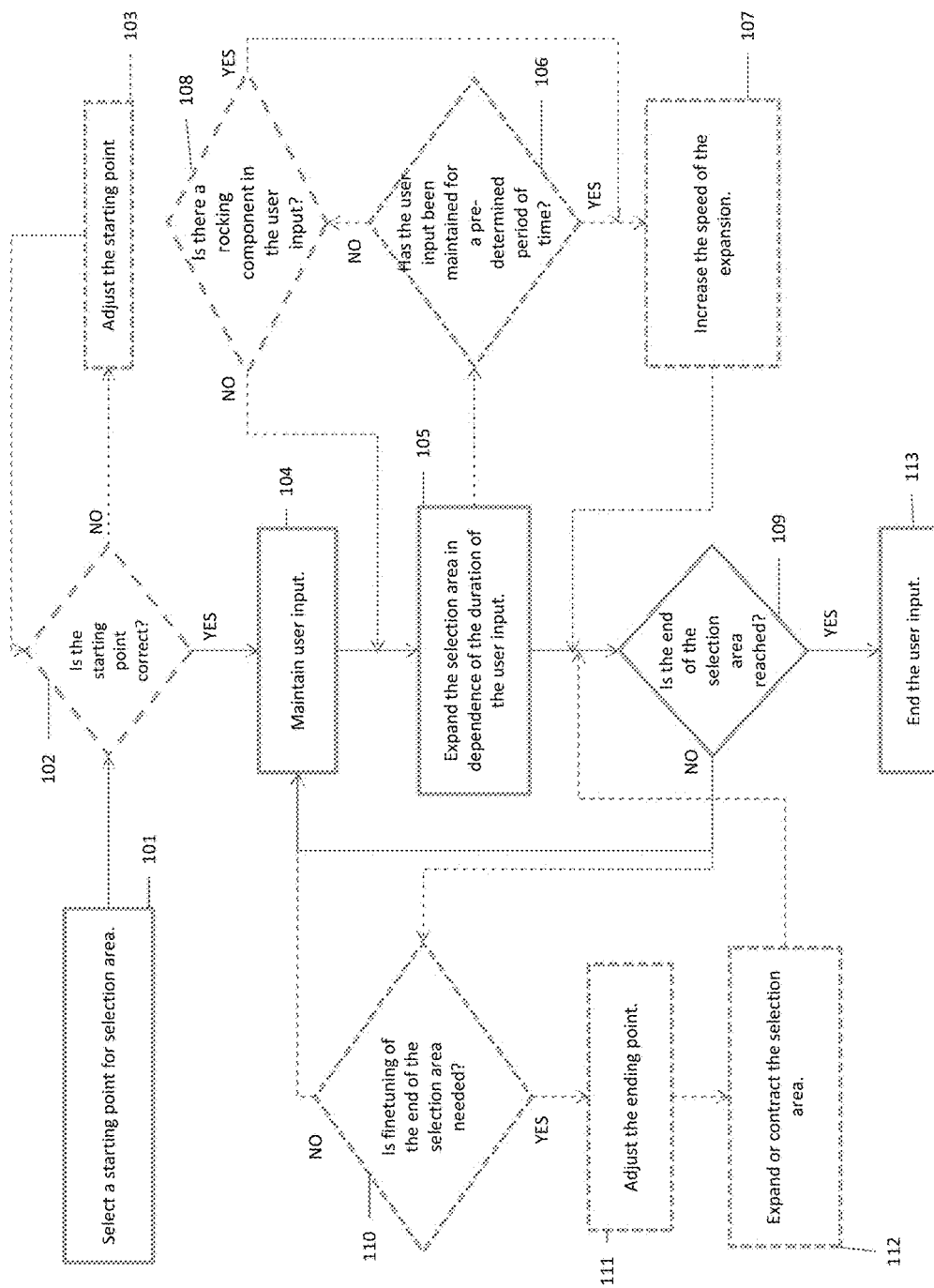

In FIG. 10A there is a flow chart representing an example embodiment of the present invention. A start point for a selection area is selected 101. The selection may be done using a user input that indicates what the most suitable start point for the selection area is. The user input may be detected using touch input detection. Optionally, it is checked if the start point indeed is at the desired location 102. This checking is done by the user. In alternative example embodiments, it may instead be done by a device. For example, if the granularity for the selection area is one word and the static touch user input is detected in the middle of a word, the start point is detected not to be in the desired location. If the start point is not correct the start point may, optionally, be adjusted 103, The start point may be adjusted for example by altering at least one characteristic of the user input. The characteristic could be for example a pressure of the detected user input or a rocking component of the user input. Once the start point is correct, then the user input is maintained 104. In response, the selection area begins to expand in dependence on the duration of the user input 105. Then, optionally, it is determined if the user input has been maintained for a certain period of time 106. If the answer is yes, the speed of the expansion is increased 107. If it the answer is no, it is detected, optionally, if there is a rocking component in the user input 108. If the answer is no, then, optionally, the expansion of the selection area continues in dependence of the duration of the user input 105. If the answer is yes, then the speed of the expansion is, optionally, increased 107. In other words, with a rocking gesture a user may increase the speed of the expansion of the selection area. Next it is determined if the end of the selection area is reached 109. If the answer is no, then the user input is maintained normally 104. Alternatively it may be optionally determined if fine-tuning the end of the selection area is needed 110. If the answer is no, then the user input is maintained 104. If the answer is yes, then the end point may optionally be adjusted 111. The end point may be adjusted, for example, by changing a characteristic of the user input 103. The adjusting is done by expanding or contracting the selection area 112. Now it may be evaluated again if the end of the selection area has been reached 109. If the answer now is yes, then the user input is ended 113.

Figure 10B:
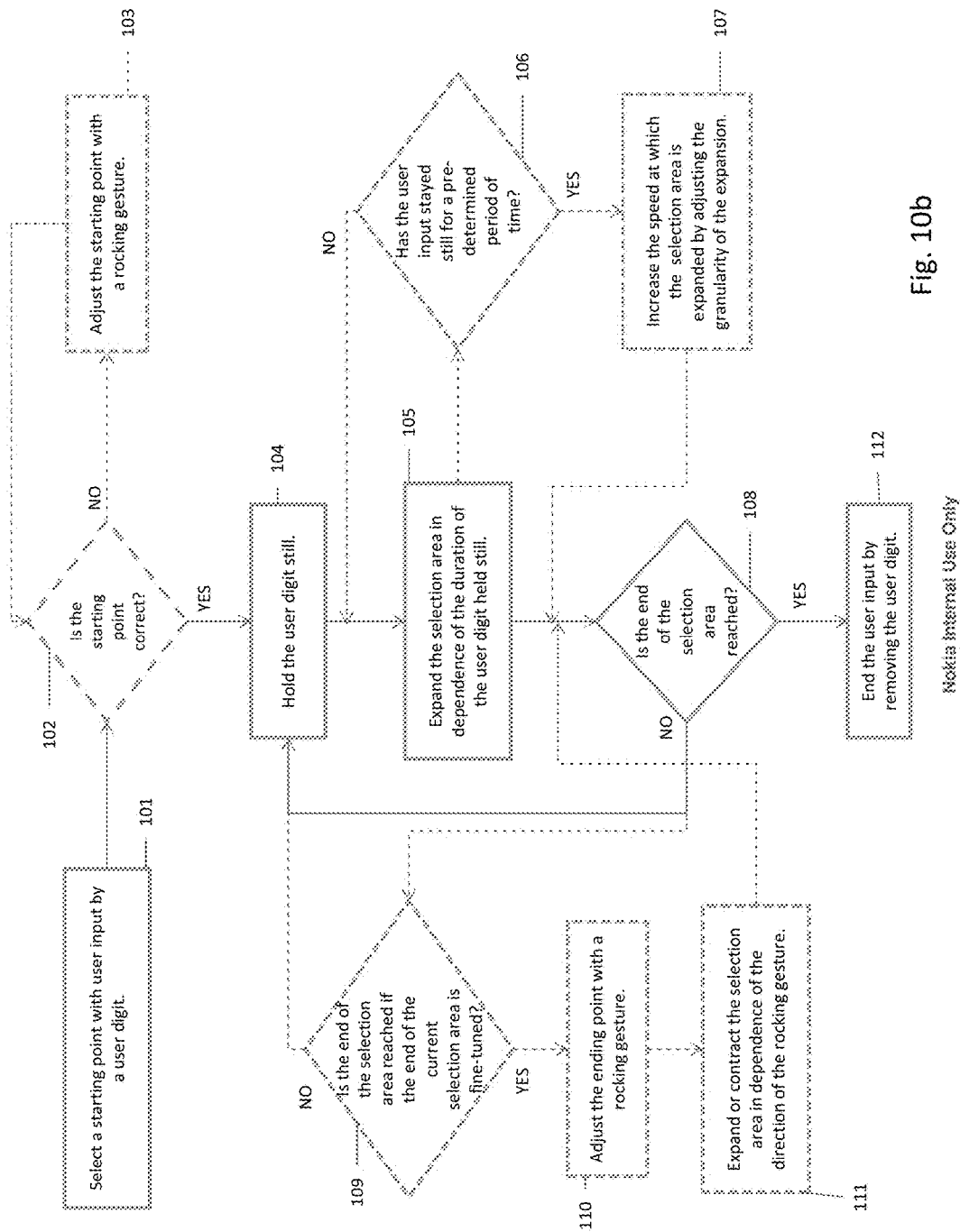

In FIG. 10B a further example embodiment is presented in a flow chart. A start point is selected with a user digit 101. Optionally, it is determined 102 if the start point is correct. If it is not, then the start point is adjusted by using a rocking gesture 103. If the start point is now correct, the user digit is now held still 104. Then the selection area is expanded in dependence of the duration of the user input. Optionally it is determined if the user input has remained for a pre-determined period of time 106. If no, then the expansion of the selection area is continued in dependence of the duration of the user input 105. If the answer is yes, then the speed at which the selection area is optionally expanded by adjusting the granularity of the expansion 107. In other words, if for example text is selected a letter by letter, the selection could be now done word by word thus increasing the speed of the expansion of the selection area. Next it is determined if the end of the selection area is reached 108. If the answer is no, then the user digit is held still 104. Alternatively, an optional step of determining if the end of the selection area needs to be fine-tuned 109. If fine-tuning is needed, then the end point may be adjusted with a rocking gesture 110. Then as a consequence, the selection area is expanded or contracted in dependence on the rocking gesture 111. If the end of the selection area is now reached the user input is removed 112.

As already mentioned above, where an example embodiment refers to a particular form of touch user input element this should be considered to refer to any suitable input element, for example, any suitable human body part (e.g. a finger, thumb, palm or the like (whether these are flesh or prosthetic)) and to any input means such as a stylus or the like (which may be a passive stylus or have active elements) unless specific indication is provided to exclude the possibility of such alternative forms of touch user input element. Similarly, in the above example embodiments, touch input includes any equivalent input mechanism such as hover input and the like.

Embodiments of the invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the invention as defined in the appended claims.

What is claimed is:

1. An apparatus, comprising at least one processor; and at least one memory including computer program code, the at least one memory and the computer program code configured to, with the at least one processor, cause the apparatus to perform at least the following:

detect a static touch user input;

define, responsive to detecting the static touch user input, a start point for a selection area, wherein the start point for the selection area is defined in dependence on the static touch user input and, in response to detecting a rocking gesture provided by at least a first rocking component of the static touch user input while a location of the static touch user input remains unchanged, the start point is adjusted to either one direction from the start point or an opposite direction from the start point;

determine an initial granularity for expanding the selection area based on the defined start point for the selection area, wherein the initial granularity is determined to be a single character in response to the start point for the selection area being between two characters within a word or number sequence, and wherein the initial granularity is determined to be a single word or number sequence in response to the start point for the selection area being between two words or number sequences;

after the start point is defined, detect a duration of the static touch user input; and define the selection area by expanding the selection area in a direction automatically determined according to a language setting at a static granularity that is fixed at the determined initial granularity in dependence on the duration of the static touch user input.

2. An apparatus according to claim 1, wherein an end point for the selection area is defined in dependence on detecting a second rocking component of the static touch user input.

3. An apparatus according to claim 1, wherein a rate at which an extent of the selection area expands or contracts varies.

4. An apparatus according to claim 3, wherein the rate at which the extent of the selection area expands or contracts is varied in dependence on detecting a third rocking component of the static touch user input.

5. An apparatus according to claim 3, wherein the rate, at which the extent of the selection area expands or contracts, varies dependent on the duration of the static user input.

6. An apparatus according to claim 1, wherein at least one item within the selection area becomes selected.

7. A method comprising:
detecting a static touch user input;

defining, responsive to detecting the static touch user input, a start point for a selection area, wherein the start point for the selection area is defined in dependence on the static touch user input and, in response to detecting a rocking gesture provided by at least a first rocking component of the static touch user input while a location of the static touch user input remains unchanged, the start point is adjusted to either one direction from the start point or an opposite direction from the start point;

determining an initial granularity for expanding the selection area based on the defined start point for the selection area, wherein the initial granularity is determined to be a single character in response to the start point for the selection area being between two characters within a word or number sequence, and wherein the initial granularity is determined to be a single word or number sequence in response to the start point for the selection area being between two words or number sequences;

after the start point is defined, detecting a duration of the static touch user input; and defining the selection area by expanding the selection area in a direction automatically determined according to a language setting at a static granularity that is fixed at the determined initial granularity in dependence on the duration of the static touch user input.

8. A method according to claim 7, wherein an end point for the selection area is defined in dependence on detecting a second rocking component of the static touch user input.

9. A method according to claim 7, wherein a rate at which an extent of the selection area expands or contracts varies.

10. A method according to claim 9, wherein the rate at which the extent of the selection area expands or contracts is varied in dependence on detecting a third rocking component of the static touch user input.

11. A method according to claim 9, wherein the rate at which the extent of the selection area expands or contracts, varies dependent on the duration of the static user input.

12. A method according to claim 7, wherein at least one item within the selection area becomes selected.

13. A computer program product comprising a non-transitory computer-readable medium bearing computer program code embodied therein, the computer program code comprising program code instructions for:

detecting a static touch user input;

defining, responsive to detecting the static touch user input, a start point for a selection area, wherein the start point for the selection area is defined in dependence on the static touch user input and, in response to detecting a rocking gesture provided by at least a first rocking component of the static touch user input while a location of the static touch user input remains unchanged, the start point is adjusted to either one direction from the start point or an opposite direction from the start point;

determining an initial granularity for expanding the selection area based on the defined start point for the selection area, wherein the initial granularity is determined to be a single character in response to the start point for the selection area being between two characters within a word or number sequence, and wherein the initial granularity is determined to be a single word or number sequence in response to the start point for the selection area being between two words or number sequences;

after the start point is defined, detecting a duration of the static touch user input; and defining the selection area by expanding the selection area in a direction automatically determined according to a language setting at a static granularity that is fixed at the determined initial granularity in dependence on the duration of the static touch user input.

14. A computer program product according to claim 13, wherein an end point for the selection area is defined in dependence on detecting a second rocking component of the static touch user input.

15. A computer program product according to claim 13, wherein a rate at which an extent of the selection area expands or contracts varies.

16. A computer program product according to claim 13, wherein at least one item within the selection area becomes selected.

* * * * *